United States Patent [19]

Fujiwa

[11] Patent Number: 5,116,932
[45] Date of Patent: May 26, 1992

[54] HYDROLYSIS RESISTANT POLYURETHANE RESINS

[75] Inventor: Takaaki Fujiwa, Hiroshima, Japan

[73] Assignee: Daicel Chemical Industries, Ltd., Osaka, Japan

[21] Appl. No.: 554,317

[22] Filed: Jul. 18, 1990

[30] Foreign Application Priority Data

Jul. 19, 1989 [JP] Japan .................................. 1-187043

[51] Int. Cl.$^5$ .................... C08G 18/34; C08G 18/42; C08G 63/08; C08G 63/82
[52] U.S. Cl. ..................................... 528/80; 528/355; 528/357; 528/358
[58] Field of Search ................... 528/77, 249, 250, 80, 528/249, 80, 355, 357, 358; 525/415; 558/267; 428/458

[56] References Cited

U.S. PATENT DOCUMENTS

| | | | |
|---|---|---|---|
| 3,754,956 | 8/1973 | Durrant et al. | 106/447 |
| 4,187,355 | 2/1980 | Wagner | 528/77 |
| 4,408,020 | 10/1983 | Kolycheck | 525/415 |
| 4,447,591 | 5/1984 | Watanabe et al. | 528/80 |
| 4,551,518 | 11/1985 | Matsumoto et al. | 528/80 |
| 4,783,544 | 11/1988 | Yokoshima et al. | 558/267 |
| 4,814,413 | 3/1989 | Thibout et al. | 528/80 |
| 4,861,672 | 8/1989 | Miyabayashi et al. | 428/458 |

FOREIGN PATENT DOCUMENTS

0133809A2  3/1985  European Pat. Off. .

Primary Examiner—John Kight, III
Assistant Examiner—Duc Truong
Attorney, Agent, or Firm—Morgan & Finnegan

[57] ABSTRACT

Polyurethane resins having excellent hydrolysis resistance are prepared from copolymerized caprolactone polyol obtained by the copolymerization of ε-caprolactone with trimethylcaprolactone having side chains as a diol component. The polyurethane resins so-obtained have excellent hydrolysis resistance, and retain high levels of mechanical strength, more excellent resistance under high heat and moisture conditions, etc., thereby maintaining a good balance of properties and are useful in a very wide variety of forms including spandex, rigid or flexible urethane foams, thermoplastic urethane elastomers, thermosetting urethane elastomers, adhesives, synthetic leather, and paints, etc.

9 Claims, No Drawings

HYDROLYSIS RESISTANT POLYURETHANE RESINS

FIELD OF THE INVENTION

The present invention relates to polyurethane resins prepared by the reaction of at least one organic diisocyanate with a polyol having copolymerized structures of ε-caprolactone with trimethylcaprolactone, wherein the polyurethane resins so-obtained have excellent hydrolysis resistance.

BACKGROUND OF THE INVENTION

Hitherto, polyurethane resins have been used in a wide variety of forms including flexible or rigid foams, adhesives, fibers such as spandex, thermoplastic or thermosetting elastomers, and or paints.

They are prepared mainly by the reaction of an organic diisocyanate compound with polyol compounds, particularly the polyurethanes having linear molecular structures are prepared by the reaction of an organic diisocyanate with a long chain having hydroxyl groups in terminal positions, and so-called chain extenders having 2 active hydrogen atoms which have a relatively lower molecular weight.

Specific chain extenders include diols, diamines and or alkanolamines, etc.

The long chain polyol compounds having hydroxyl groups in terminal positions include polyester polyols, polyether polyols such as polypropylene glycols, polytetramethylene glycols, polyols having carbonate groups in their molecular structures, that is, polycarbonatediols, etc.

The specific polyester polyols include polyols which are derived from divalent carboxylic acids such as adipic acid and polyhydric alcohols such as ethylene glycol, 1,4-butyleneglycol and or 1,6-hexanediol, etc., and polylactone polyols which are obtained with ε-caprolactones, etc., as starting materials.

The specific polyether polyols include polymers of ethyleneoxide or propyleneoxide, copolymers thereof, and or polytetramethyleneglycol which is a polymer of tetrahydrofuran.

Polyurethane resins derived from polyether polyols are used in fields of elastic fibers or urethane elastomers in which low permanent compressive deformation is required.

The specific polycarbonatediols mainly include those having 1,6-hexanediol structures in the molecule.

However, the polyurethanes derived from adipic acid and polyhydric alcohols such as ethylene glycol, etc., have a disadvantage because of a lack of water resistance in spite of the advantage of the elastic recovery property.

On the other hand, the polyurethanes derived from adipic acid and polyhydric alcohols such as 1,4-butylene have a disadvantage because of a lack of the elastic recovery property in spite of the advantage of the water resistance property.

Furthermore, polyurethanes derived from poly-ε-caprolactone polyols have advantages not only of excellent water resistance property, but also excellent outdoor durability and excellent heat resistance which are disadvantages in the polyether polyols.

However, hydrolysis resistance is not sufficient in the polyurethanes derived from the poly-ε-caprolactone polyols.

The polycarbonatediols derived from 1,6-hexanediol are usually solid.

Accordingly, it is required that polyvalent alcohols having side chains or polyether polyols having appropriate molecular weight be introduced in order to make them liquid.

As a result of an intensive investigation, the inventor of this invention has now found that it is possible to solve the problems of known polyurethane resins and has prepared polyurethanes having excellent hydrolysis durability by using polyols obtained by copolymerizing ε-caprolactone with trimethylcaprolactone.

SUMMARY OF THE INVENTION

In accordance with the present invention, there is provided polyurethane resins having excellent hydrolysis resistance by using as the diol component a copolymerized caprolactone polyol obtained by reaction of ε-caprolactone not having any side chains with trimethylcaprolactone.

The polyurethane resin of the invention has excellent hydrolysis resistance, while retaining high levels of mechanical strength, more excellent resistance under high heat and moisture conditions, etc., thereby maintaining a good balance of properties.

Polyurethane resins produced in accordance with the present invention are useful in a very wide variety of forms including spandex, rigid or flexible urethane foams, thermoplastic urethane elastomers and thermosetting urethane elastomers, adhesives, synthetic leather, and paints, etc.

DETAILED DESCRIPTION OF THE INVENTION

The copolymerized caprolactone polyols to be used in the present polyurethane resins are obtained by copolymerizing ε-caprolactone and trimethylcaprolactone in the presence of a ring-opening or initiating agent. Typical ring-opening or initiating agents include polyester polyols, polyether polyols, polycarbonate polyols, etc.

Illustrative ring-opening or initiating agents include ethyleneglycol, diethyleneglycol, triethyleneglycol, tetraethyleneglycol, polyethyleneglycol, dipropyleneglycol, tripropyleneglycol, polypropyleneglycol, polypropyleneglycol polypropylenepolyol which is produced by ring-opening polymerization of propyleneoxide with many kinds of polyhydric acids, and also polyetherpolyols produced by copolymerization of ethyleneoxide with propyleneoxide, etc.

Furthermore, tetramethyleneglycol which is a ring-opened polymer of tetrahydrofuran can be used.

Additionally, a compound having free-radical polymerizability such as hydroxyethylacrylate or hydroxymethylacrylate can be used as a ring-opening or initiating agent.

ε-caprolactone monomer and trimethylcaprolactone monomer are used with the above described polyetherpolyols to produce a lactone polyol having copolymerized structures derived from 2 kinds of lactones.

ε-caprolactone monomer, which is a lactone monomer not having side chains, can be produced by Baeyer-Villiger rearrangement on an industrial basis, in which cyclohexanone is oxidized by peracids such as hydroperoxide or peracetic acid.

Trimethylcaprolactone monomer, which is a lactone monomer having side chains, can be produced by Baeyer-Villiger rearrangement on an industrial basis, in which trimethylcyclohexanone is oxidized by peracids such as hydroperoxide or peracetic acid. In the present application, trimethylcaprolactone is intended to include 3,5,5-trimethylcaprolactone and/or 3,3,5-trimethylcaprolactone and/or mixtures thereof.

The molar ratio of trimethylcaprolactone monomer to ε-caprolactone monomer can be adjusted over a wide range.

A specific range is from about 0.1 to 10, preferably from about 0.4 to 5.

When the molar ratio is less than 0.1, hydrolysis-resistance based on the addition of trimethylcaprolactone monomer is low.

On the other hand, when the molar ratio is more than 10, the present urethane resin is too soft.

The molar ratio of lactone monomers to the above described ring-opening or initiating agent can be also varied over wide range, specifically from about 200 to 10, preferably from about 100 to 50.

When the molar ratio is less than 10, molecular weight of the copolymerized lactone polyol is too low, while on the other hand when the molar ratio is more than 200, the molecular weight of the copolymerized lactone polyol is too high in order to obtain preferable polyurethane resins.

In carrying out ring-opening copolymerization reaction of the lactones with the above described ring-opening or initiating agents, perchloric acid or a salt thereof is preferably used as a catalyst.

Illustrative perchloric salt include alkali metal salts such as sodium perchlorate, potassium perchlorate and lithium perchlorate, and silver perchlorate, etc.

The above described catalysts can be used alone, or two or more of them together can also be used.

Furthermore, a metal such as titanium, tin, zinc, aluminum, iron, and boron, etc., can be used together with the above catalysts, to enhance the catalytic effect.

It is generally appropriate to use the catalyst in the amount which is equal to preferably from about 0.01 to 1000 ppm, of the total weight of the starting materials.

When the amount of the catalyst is less than 0.01 ppm, the catalytic effect is lower.

On the other hand, an amount of more than 1000 ppm provides only a slight increase of catalytic effect, but requires the removal of the catalyst from the caprolactone polyol in order to prevent abnormal reactivity in the urethane-forming reaction.

Accordingly, it is not economical to use such a large amount of catalyst because of the prolonged procedure required for removal of the catalyst.

It is preferable to employ a co-polymerization reaction temperature in the range of from about 20° C. to 200° C., more preferably from about 50° C. to 150° C.

Necessarily high reaction temperatures are preferably not used since it is known that a lactone monomer having side chains decomposes at high reaction temperatures because of steric repulsion and this may lead to instabilization.

The copolymerization reaction can be carried out in either air or nitrogen atmosphere.

Accordingly, exclusion of air is not required. However, it is preferable that an inert gas such as nitrogen is used in order to prevent coloration of resin.

In the case of using a compound having free-radical polymerizability such as hydroxyethylacrylate or hydroxymethylacrylate as the ring-opening or initiating agent, a polymerization inhibitor such as p-methoxyphenol, dibutylhydroxytoluene can be used.

The reaction can be carried out in the presence or absence of a solvent.

It is more advantageous that a solvent is not used in the ring-opening reaction in the case of production on an industrial basis.

If any solvent is used, it is preferable to use an inert one. Illustrative of the solvents which can be used are benzene, toluene, xylene, ethyl acetate, butyl acetate, methyl ethyl ketone, carbon tetrachloride, etc.

The present polyurethane resins, are prepared by the reaction of an organic diisocyanate with the above described copolymerized lactone polyol.

Illustrative of the organic diisocyanates which can be employed include 2,4-tolylene diisocyanate, 2,6-tolylene diisocyanate, 4,4'-diphenylmethane diisocyanate, toluidine diisocyanate, xylene diisocyanate, hydrogenated 4,4'-diphenylmethane diisocyanate, hexamethylene diisocyanate, isophorone diisocyanate, 4,4'-dicyclohexylmethane diisocyanate, 1,5-naphthalene diisocyanate, carbodiimide-modified methylene diisocyanate and xylylene diisocyanate.

The diisocyanates may be used alone or in admixture.

A chain extender may also be added to the reaction mixture, if desired.

A low-molecular compound having active hydrogen can be used as the chain extender.

Illustrative examples of chain extenders are ethylene glycol, propylene glycol, 1,4-butylene glycol, 2-methylpropanediol, neopentyl glycol, pentane-diol, 1,6-hexanediol, ethylenediamine, propylenediamine, hydrazine, isophoronediamine, metaphenylenediamine, 4,4'-diaminodiphenylmethane, diaminodiphenylsulfone, and 3,3'-dichloro-4,4'-diaminodiphenylmethane.

The preparation of polyurethanes according to the present invention can be accomplished either by the prepolymer process in which a polyol and an excess of an organic diisocyanate compound are allowed to react to form a prepolymer having isocyanate group in terminal positions and the prepolymer is allowed to react with a diol, diamine, etc., as a chain extender, or by a one-shot process in which all of the constituents required for making a polyurethane are added simultaneously. The ratio of polyol and chain extender to diisocyanate may vary over a wide range. Preferably the NCO/OH is about 0.5 to 3.0 equivalently, more preferably 0.07 to 1.1.

A solvent may optionally be used for performing any such reaction.

If any solvent is used, it is preferable to use one which is inert to the above described diisocyanate.

Illustrative solvents which can be used include ethyl acetate, butyl acetate, methyl ethyl ketone, dimethylformamide, and tetrahydrofuran.

A catalyst can optionally be employed for promoting the urethane formation reaction.

Illustrative catalysts include organic tin compounds such as tin octylate or dibutyl-tin dilaurate, or tertiary amines such as N-methylmorpholine or triethyl amine.

The present invention is illustrated below by examples and comparative examples.

SYNTHESIS EXAMPLE 1 copolymerization reaction for the preparation of a copolymerized lactone polyol

A flask having a capacity of 200 mililiters and equipped with a stirrer and a thermometer, was charged with 69 g (0.44 mols) of trimethylcaprolactone, 103.5 g (0.91 mols) of ε-caprolactone, 5.5 g(0.09 mols) of ethylene glycol and 10 ppm of perchloric acid as a catalyst.

The temperature of the reaction vessel was raised to 100° C., and reaction was carried out for 25 hours, followed by being cooled to room temperature.

The obtained copolymerized lactone polyol was a hydroxyl value of 46.70 and number average molecular weight of 2203.

SYNTHESIS EXAMPLE 2 copolymerization reaction for the preparation of a copolymerized lactone polyol

The same process as described in Synthesis Example 1 was repeated, except that 103.5 g of ε-caprolactone and 69.0 g of trimethylcaprolactone were used to obtain a copolymerized lactone polyol having a hydroxyl number of 46.2.

SYNTHESIS EXAMPLE 3 copolymerization reaction for the preparation of a copolymerized lactone polyol

The same process as described in Synthesis Example 1 was repeated, except that 5.5 g diethylene glycol was used in place of ethylene glycol to obtain a copolymerized lactone polyol having a hydroxyl nubmer 46.0.

COMPARATIVE SYNTHESIS EXAMPLE 1 polymerization reaction of a lactone polyol

A flask having a capacity of 200 mililiters and equipped with a stirrer and a thermometer, was charged with 69 g (0.61 mole) ε-caprolactone, 5.5 g (0.09 mols) of ethylene glycol and 10 ppm of tin chloride as a catalyst The temperature of the reaction vessel was raised to 170° C., and reaction was carried out for 5 hours, followed by being cooled to room temperature.

The obtained copolymerized lactone polyol was a hydroxyl value of 56.2 and acid value of 0.25.

COMPARATIVE SYNTHESIS EXAMPLE 2 polymerization reaction of a lactone polyol

The same process as described in Comparative Synthesis Example 1 was repeated except that 5.5 g diethylene glycol ws used in place of ethylene glycol to obtain a lactone polyol.

EXAMPLE 1 reaction of a copolymerized lactone polyol with diisocyanate

A flask having a capacity of 500 mililiters and equipped with a stirrer and a thermometer, was charged with 98.4 g of the copolymerized lactone polyol obtained in Synthesis Example 1, 8.0 g of 1,4-butanediol, 32.8 g of 4,4'-diphenylmethane diisocyanate and 209.8 g of N,N- di-methylformamide.

The temperature of the reaction vessel was raised to 80° C., and reaction was carried out for 5 hours, followed by aging for 3 hours while maintaining a temperature of 60° C.

A urethane dope having a viscosity of 33,000 centipoise was obtained.

EXAMPLE 2 reaction of a copolymerized lactone polyol with diisocyanate

The same process as descirbed in Example 1 was repeated, except that the copolymerized polyol obtained in Synthesis Example 2 was used.

EXAMPLE 3 reaction of a copolymerized lactone polyol with diisocyanate

The same process as descirbed in Example 1 was repeated, except that the copolymerized polyol obtained in Synthesis Example 3 and 29.3 g of isophorone diisocyanate were used.

EXAMPLE 4 reaction of a copolymerized lactone polyol with diisocyanate

The same process as descirbed in Example 1 was repeated, except that 8.0 g of 2-methyl-1, 3-propanediol and 22.9 g of tolylene diisocyanate were used.

COMPARATIVE EXAMPLE 1 reaction of a polymerized lactone polyol with diisocyanate

A flask having a capacity of 500 mililiters and equipped with a stirrer and a thermometer, was charged with 100.0 g of the polymerized lactone polyol obtained in Comparative Synthesis Example 1, 8.0 g of 1,4-butanediol, 33.0 g of 4,4'-diphenylmethane diisocyanate and 209.0 g of N,N-dimethylformamide.

The temperature of the reaction vessel was raised to 80° C., and reaction was carried out for 5 hours, followed by aging for 3 hours while maintaining a temperature of 60° C.

COMPARATIVE EXAMPLE 2 reaction of a polymerized lactone polyol with diisocyanate

The same process as described in Comparative Example 1 was repeated, except that the polymerized lactone polyol obtained in Comparative Synthesis Example 1 was replaced with the polymerized lactone polyol obtained in Comparative Synthesis Example 2.

APPLICATION EXAMPLE 1

Urethane films having a film thickness of 150 microns were prepared from the urethane dope obtained in the Examples and Comparative Examples to evaluate physical properties. Heat testing was carried out under moisture conditions and a temperature of 121° C. and relative humidity of 95% and pressure of 1.0 kg/cm² to evaluate physical properties.

Table-1 indicates the results.

TABLE 1

| | Example | | | | Comparative Example | |
|---|---|---|---|---|---|---|
| | 1 | 2 | 3 | 4 | 1 | 2 |
| Before Heat Testing Under Moisture Conditions | | | | | | |
| 100% Modulus (kg/cm²) | 41 | 50 | 45 | 50 | 45 | 43 |
| 300% Modulus (kg/cm² | 135 | 150 | 135 | 140 | 135 | 130 |
| tensile strength | 610 | 620 | 620 | 630 | 600 | 600 |

TABLE 1-continued

| | Example | | | | Comparative Example | |
|---|---|---|---|---|---|---|
| | 1 | 2 | 3 | 4 | 1 | 2 |
| (kg/cm$^2$) elongation (%) | 597 | 620 | 610 | 630 | 655 | 600 |
| After Heat Testing Under Moisture Conditions | | | | | | |
| 100% Modulus (kg/cm$^2$) | 41 | 50 | 45 | 49 | 40 | 35 |
| 300% Modulus (kg/cm$^2$) | 136 | 149 | 134 | 138 | 120 | 100 |
| tensile strength (kg/cm$^2$) | 600 | 615 | 610 | 625 | 500 | 500 |
| elongation (%) | 590 | 615 | 605 | 629 | 500 | 500 |

While the invention has been described in detail and with reference to specific embodiments thereof, it will be apparent to one skilled in the art that various changes and modifications can be made therein without departing from the spirit and scope thereof.

What is claimed is:

1. A polyurethane resin comprising the reaction product of at least one organic diisocyanate compound with a polyol having at least 2 active hydrogen atoms wherein the polyol is a copolymerization product of ε-caprolactone and trimethylcaprolactone.

2. A polyurethane resin according to claim 1, wherein the copolymerization is carried out in the presence of perchloric acid.

3. A polyurethane resin according to claim 1, wherein the copolymerization is carried out in the presnece of a metal salt of perchloric acid.

4. A polyurethane resin according to claim 1, wherein the copolymerization is carried out in the presence of a ring-opening or initiating agent.

5. A polyurethane resin according to claim 1, wherein the molar ratio of the trimethylcaprolactone to ε-caprolactone is from 0.1 to 10.

6. A polyurethane resin according to claim 1, wherein a low molecular weight compound having active hydrogens is used as a chain extender in the formation of the polyurethane.

7. A polyurethane resin according to claim 1, wherein said polyol has a ratio of 2 mole of ε-caprolactone to mole of trimethylcaprolactone.

8. A process for producing a polyurethane resin which comprises reacting at least one organic diisocyanate with a polyol having at least 2 active hydrogen atoms, said polyol being the copolymerization product of ε-caprolactone and trimethylcaprolactone.

9. A process for producing a polyurethane resin according to claim 4, wherein the copolymerization is carried out in the presence of perchloric acid or a metallic salt thereof as a catalyst.

* * * * *